(12) United States Patent
Do et al.

(10) Patent No.: US 10,943,027 B2
(45) Date of Patent: Mar. 9, 2021

(54) DETERMINATION AND VISUALIZATION OF EFFECTIVE MASK EXPRESSIONS

(71) Applicant: SAP SE, Walldorf (DE)

(72) Inventors: Hong-Hai Do, Berlin (DE); Yeonwoon Jung, Berlin (DE)

(73) Assignee: SAP SE, Walldorf (DE)

(*) Notice: Subject to any disclaimer, the term of this patent is extended or adjusted under 35 U.S.C. 154(b) by 365 days.

(21) Appl. No.: 15/938,188

(22) Filed: Mar. 28, 2018

(65) Prior Publication Data

US 2019/0303614 A1   Oct. 3, 2019

(51) Int. Cl.
  *G06F 21/62* (2013.01)
  *G06F 12/0802* (2016.01)
  *G06F 3/06* (2006.01)
  *G06F 12/0871* (2016.01)

(52) U.S. Cl.
  CPC ........ *G06F 21/6254* (2013.01); *G06F 3/0604* (2013.01); *G06F 3/065* (2013.01); *G06F 12/0802* (2013.01); *G06F 12/0871* (2013.01)

(58) Field of Classification Search
  CPC .. G06F 21/6254; G06F 3/065; G06F 12/0871; G06F 3/0604; G06F 12/0802
  USPC .......................................................... 726/26
  See application file for complete search history.

(56) References Cited

U.S. PATENT DOCUMENTS

| 7,676,522 | B2 | 3/2010 | Klein et al. | |
| 7,676,523 | B2 | 3/2010 | Klein et al. | |
| 8,229,883 | B2 | 7/2012 | Brauer et al. | |
| 8,346,819 | B2 | 1/2013 | Do et al. | |
| 9,280,569 | B2 | 3/2016 | Do et al. | |
| 10,594,721 | B1* | 3/2020 | Scotney | H04L 63/1433 |
| 2013/0144901 | A1* | 6/2013 | Ho | G06F 16/2456 707/769 |
| 2014/0013451 | A1* | 1/2014 | Kulka | G06F 21/14 726/29 |
| 2016/0188973 | A1* | 6/2016 | Ziaja | G06F 21/62 382/116 |
| 2016/0358069 | A1* | 12/2016 | Brothers | G06F 7/764 |
| 2017/0126681 | A1* | 5/2017 | Barrett | H04L 63/08 |
| 2017/0132420 | A1* | 5/2017 | Shetty | G09C 1/04 |
| 2017/0323119 | A1* | 11/2017 | Harp | G06F 21/78 |
| 2017/0337386 | A1* | 11/2017 | Kumaresan | G06F 21/604 |
| 2017/0339111 | A1* | 11/2017 | Balabine | G06F 16/84 |
| 2018/0285591 | A1* | 10/2018 | Thayer | G06F 21/6254 |

* cited by examiner

*Primary Examiner* — Tae K Kim
*Assistant Examiner* — Peiliang Pan
(74) *Attorney, Agent, or Firm* — Fish & Richardson P.C.

(57) ABSTRACT

The present disclosure involves systems, software, and computer implemented methods for determining and visualizing effective mask expressions. One example method includes identifying a request for an object in a software application. The request is associated with a particular user. An object hierarchy associated with the requested object is identified. At least one column in the object hierarchy is associated with a mask expression. A current dependent object in the identified object hierarchy is determined. Masking status data for the current dependent object is determined that identifies whether masking is to be applied to the current dependent object when fulfilling the request. The generated masking status data is used to determine which masking expressions are to be applied to which columns in the object hierarchy when responding to the request.

14 Claims, 7 Drawing Sheets

| Name | | Meaning |
|---|---|---|
| DEPENDENT_OBJECT_NAME | 308 | Name of the dependent object |
| DEPENDENT_OBJECT_TYPE | 310 | Type of the dependent object, such as View, Procedure, Function, etc. |
| DEPENDENT_COLUMN_NAME | 312 | Name of the column of the dependent object |
| UNDERLYING_OBJECT_NAME | 314 | Name of the object as a direct child of the dependent object |
| UNDERLYING_OBJECT_TYPE | 316 | Type of the underlying object |
| UNDERLYING_COLUMN_NAME | 318 | Name of the column of the underlying object contributing to the column of the dependent object |
| EFFECTIVE_USER_NAME | 320 | Name of the user effectively accessing the underlying object |
| MASK_EXPRESSION | 322 | Mask expression attached to the underlying object |
| MASK_EXPRESSION_STATUS | 324 | Values { NULL | APPLIED | NOT APPLIED } indicating whether masking is applied or not. NOT APPLIED if the effective user has the UNMASKED privilege, while NULL indicates that the column does not have a mask definition. |

| Name 402 | Level 1 404 | Level 2 406 |
|---|---|---|
| DEPENDENT_OBJECT_NAME 308 | <Final Result> 408 | Employees_1 424 |
| DEPENDENT_OBJECT_TYPE 310 | <Final Result> 409 | View 428 |
| DEPENDENT_COLUMN_NAME 312 | Birthdate 410 | Birthdate 430 |
| UNDERLYING_OBJECT_NAME 314 | Employees_1 414 | Employees_2 426 |
| UNDERLYING_OBJECT_TYPE 316 | View 416 | View 429 |
| UNDERLYING_COLUMN_NAME | Birthdate 412 | Birthdate 432 |
| EFFECTIVE_USER_NAME 318 | Enduser 420 | Owner_1 427 |
| MASK_EXPRESSION 322 | Birthdate = __/__/1980 | Birthdate = __/__/2000 434 |
| MASK_EXPRESSION_STATUS 324 | APPLIED 422 | APPLIED 436 |

| Name | Level 1 602 | Level 2 620 | Level 2 622 |
|---|---|---|---|
| DEPENDENT_OBJECT_NAME 308 | <Final Result> 604 | Employees 624 | Employees 626 |
| DEPENDENT_OBJECT_TYPE 310 | <Final Result> 606 | View 628 | View 630 |
| DEPENDENT_COLUMN_NAME | Address 608 | Address 632 | Address 634 |
| UNDERLYING_OBJECT_NAME 314 | Employees 612 | Address_1 636 | Address_2 642 |
| UNDERLYING_OBJECT_TYPE 316 | View 614 | View 638 | View 644 |
| UNDERLYING_COLUMN_NAME | Address 610 | Street 640 | ZipCode 646 |
| EFFECTIVE_USER_NAME 320 | Enduser 616 | Owner_1 648 | Owner_1 650 |
| MASK_EXPRESSION 322 | 'YYYY' 660 | 'XXXX' 652 | 'XXXX' 656 |
| MASK_EXPRESSION_STATUS 324 | APPLIED 662 | APPLIED 654 | NOT APPLIED 658 |

FIG. 6

DETERMINATION AND VISUALIZATION OF EFFECTIVE MASK EXPRESSIONS

TECHNICAL FIELD

The present disclosure relates to computer-implemented methods, software, and systems for determining and visualizing effective mask expressions.

BACKGROUND

Data masking can be used to obfuscate classified, personal, other otherwise sensitive data. The original sensitive data can be hidden with random characters, for example. For some applications, data may be masked depending on the role of a user viewing the data. If the user has appropriate permissions, the original data may be shown without masking. If an unauthorized user does not have appropriate permissions to view certain sensitive data, the sensitive data may be masked, such as by replacing or scrambling original data, so that the original data is not viewable by the unauthorized user.

SUMMARY

The present disclosure involves systems, software, and computer implemented methods for determining and visualizing effective mask expressions. One example method includes identifying a request for an object in a software application, the request associated with a particular user. An object hierarchy associated with the requested object is identified. At least one column in the object hierarchy is associated with a mask expression. A current dependent object in the identified object hierarchy is determined. Masking status data for the current dependent object is determined that identifies whether masking is to be applied to the current dependent object when fulfilling the request. At least one dependent column in the current dependent object is determined.

Various processing is performed for each given determined dependent column. Each underlying object associated with the current dependent object from the identified object hierarchy that contributes data to the given determined dependent column is determined. A current effective user accessing the underlying objects is determined. At least one underlying column of at least one underlying object that contributes to the given determined dependent column and has an attached mask expression is determined.

Various processing is performed for each determined underlying column. A determination is made as to whether the current effective user has an unmasked privilege on a given underlying object that includes the given determined underlying column. Masking status data for the current dependent object is generated based on whether the current effective user has the unmasked privilege on the given underlying object.

A determination is made as to whether there are any unprocessed object relationships beneath the current dependent object in the object hierarchy. In response to determining that there is at least one unprocessed object relationship beneath the current dependent object in the object hierarchy, an unprocessed underlying object is identified as a new current dependent object and the generating of masking status data is recursively repeated using the new current dependent object as the current dependent object. At the end of the recursive repeating, the generated masking status data is used to determine which masking expressions are to be applied to which columns in the object hierarchy when responding to the request.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is an example table that can be used in a mask application process, to determine which, if any, mask expressions to apply when generating results for a query.

FIG. 4 is an example table that includes masking-related metadata.

FIG. 6 is an example table that includes masking-related metadata corresponding to a data flow graph.

DETAILED DESCRIPTION

Figure 1:
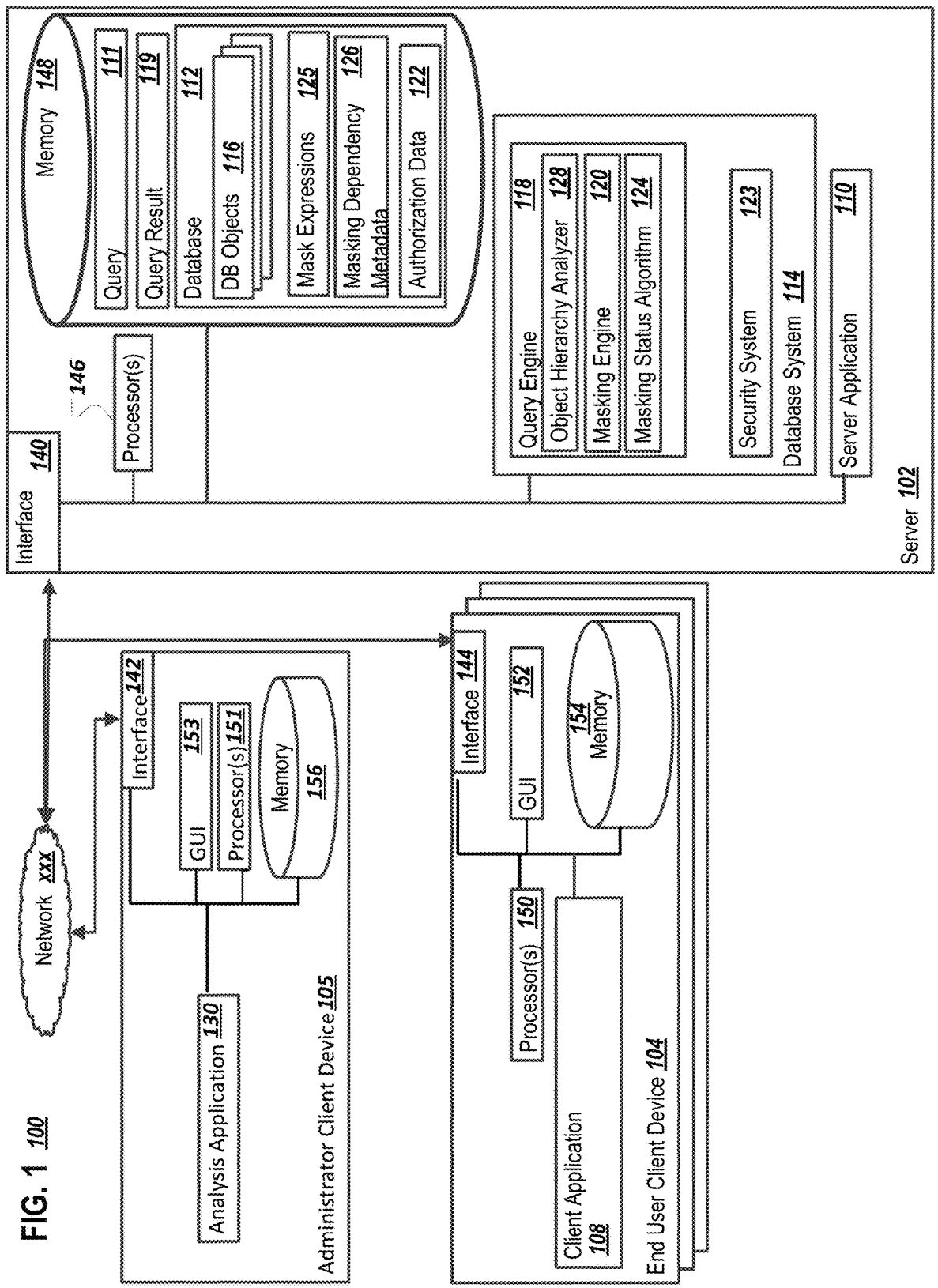
FIG. 1 is a block diagram illustrating an example system for generating masking status data.

Security requirements for a database or an application may specify that different users, some with different roles, have different access to different types of data. For example, some users can be given access to different portions of data than other users. For example, some users can access some data from certain database tables for which other users do not have access. As another example, some users can be given permission to access certain sensitive data items, whereas other users cannot access those same sensitive data items. For example, for an Employees database table that stores information about employees, some database users can access data from all columns of the Employees table, including sensitive fields such as salary, whereas other users can access data from non-sensitive fields, such as name and department, but not data from sensitive fields such as salary.

When a user who does not have access to sensitive information views an Employee record, varying approaches can be taken to prevent unauthorized users from viewing sensitive data. For example, critical data can initially be replicated, where the replicated data is then obfuscated (e.g., scrambled) and provided or presented to unauthorized users. While effective, the required replication can introduce resource concerns since replication of data can consume processing and storage resources. Another approach is to use masking, which can involve dynamically applying a mask expression so that actual data for a field is not displayed, but rather data created from the application of a mask expression. For example, a "dummy" value of '00000' can be displayed instead of an actual salary value to an unauthorized user.

A mask expression generally returns masked data of a same data type as the original data. For string data types, expressions or values such as 'XXXX' would make masked data obvious in a query result. However, for other data types, such as date and number fields, masked data may appear as valid date or integer values which potentially cannot be distinguished from the original data. Accordingly, it can be important to know when mask expressions have been enforced, in various situations, as described below. Developers generally select mask expressions such that the actual data being masked is not discoverable or able to be inferred from the masked data generated from the mask expression. The database system can provide a flexible masking framework that allows developers to define mask expressions that can be dynamically applied, and can be based on dynamic conditions (e.g., current state of other data in the database system). A mask expression can be of any complexity, either inlined or defined in a library, that can perform a transformation of given data value to a masked value. Mask functions can be reused, for multiple columns that include a same type of data or similar data values.

Data masking can be defined using mask expressions that are attached to database objects, such as tables and views. Depending on the authorization of a user accessing an object, either original data or data transformed by attached mask expression(s) can be displayed. Mask expressions can be evaluated by a database during query processing, which can provide a more flexible, less-resource-consuming solution than pre-query data replication. As described below, database objects can be built on top of each other, resulting in complex object hierarchies, which can be common in real-world scenarios. Without support for analysis of effective mask expressions, it can be challenging or impossible to verify correctness of data flows included in such complex scenarios.

With dynamic data masking, it can be difficult to determine an effective mask expressions when a query requests data that is part of a complex database object hierarchy. When database objects depend on each other, with each having different mask expressions or not having a masking expression, data may be masked or unmasked during query processing through multiple, different levels of the object hierarchy. Effective mask expressions can be identified at each level of the object hierarchy and a determination can be made as to whether a given mask expression is applicable for the user in the context of the query and the object hierarchy relationships.

A mask application process can be used to determine mask expressions with their effective statuses at each database object being accessed by a user's query. The mask application process can, based on the use of available masking metadata, generate (or access) an object hierarchy for a given query from the current user's perspective and determine if the access of data at each level, by a dependent object or user that is accessing an underlying object, is subject to masking defined by the underlying object.

The mask application process can be used, for example, by an administrator when unexpected results or unexpected behaviors occur for some database users and applications. The administrator can use the mask application process to quickly examine an object hierarchy to understand complex masking scenarios. Determined mask expressions with their effective statuses can be presented to the administrator in one or more visualizations, for example. A visualization can present information indicating whether masking has been applied at various levels of the object hierarchy without displaying data that even an administrator should not or does not have authorization to view (e.g., credit card information). The administrator can use visualizations of masking scenarios to explain results of user queries, to interested parties who otherwise might not understand why queries are not performing as expected.

Determining whether masking has been applied in certain situations can be useful for developers who may create queries that, for example, aggregate data from underlying objects (either directly or indirectly). If mask expressions have been (or will be) applied to data used by the query, then aggregation done by the query may not be valid. A developer (or an administrator) can use generated masking statuses and expressions to troubleshoot why a query is not returning expected results, as well as in planning particular queries or query strategies. A developer of a query object may discover, for example, that a database user corresponding to the developer (e.g., the owner of the query object) needs an unmasked privilege on an underlying object so that the underlying object returns unmasked, rather than masked, data, thereby allowing the aggregation done by the query to be performed correctly. Developers can use the generated masking statuses and expressions to verify whether correct masking is being applied or whether there are currently errors in the overall application of masking for a particular query under development.

FIG. 1 is a block diagram illustrating an example system 100 for generating masking status data. Specifically, the illustrated system 100 includes or is communicably coupled with a server 102, an end-user client device 104, an administrator client device 105, and a network 106. Although shown separately, in some implementations, functionality of two or more systems or servers may be provided by a single system or server. In some implementations, the functionality of one illustrated system or server may be provided by multiple systems or servers.

A client application 108 on the client device 104 is a client-side version of a server application 110 on the server 102. The client application 108 can send a query 111 to the server application 110, for data stored in a database 112 and managed by a database system 114. The query 111 from the client application 108 can be for one or more database objects 116 stored in the database 112. The database objects 116 can be related to one another in one or more object hierarchies. For example, a first database object can depend on, e.g., get data from, a related, underlying object.

A query engine 118 can process the query 111 received from the client application 108, to generate a query result 119 that is returned to the client application 108 in response to the received query 111. Although client-provided queries are described, the query engine 118 can also receive queries from and provide query results to the server application 110.

The query engine 118 can, as part of query processing, use a masking engine 120 to determine whether data masking (and which data masking) is to be applied to the query result 119 to mask sensitive data shown to unprivileged users, as described above. Masking can also occur between any two related objects. For example, an underlying object may have a masking expression defined, which is to be applied if the owner of an accessing, e.g., dependent, object does not have sufficient privileges to view sensitive data stored in a column associated with the masking expression. The query 111 may request an object that is part of an object hierarchy of any number of levels, and masking can occur at any level (and at multiple levels).

The masking engine 120 can query authorization data 122 managed by a security system 123 to determine whether the effective user (e.g., an end user, or a dependent object owner), has an unmasked privilege on an underlying object. If the effective user does not have the unmasked privilege on the underlying object, a mask expression associated with the underlying object can be applied before data is provided by the underlying object to a dependent object (or in the query result 119, if the query 111 itself is the dependent object). If the effective user has the unmasked privilege on the underlying object, then actual (e.g., unmasked) data is provided by the underlying object.

When a query accesses an object that is part of a complex object hierarchy, unexpected results can occur, which can be caused by the unexpected application (or unexpected non-application) of one or more mask expressions at one or more levels in the object hierarchy. Determining which mask expressions have been applied can be challenging when just looking at the query result 119. Application developers, or support personnel, may desire to troubleshoot an issue with the query 111, to determine which (if any) masking expressions have been applied, and at which levels of the object hierarchy.

The masking engine 120 can use a masking status algorithm 124 (which is described below) to determine mask expressions 125 that are applicable (or not applicable) to the query 111. The masking engine 120 can generate and/or can refer to masking dependency metadata 126 that includes, for example, data representing object relationships between dependent and underlying objects, which underlying columns contribute data to which dependent columns, and, for underlying columns that have masking expressions 125 defined, what the masking expressions 125 are and whether they are applicable to a given object relationship, assuming access by a particular effective user (e.g., end user or dependent object owner).

Some (or all) of the masking dependency metadata 126 can be generated and maintained prior to receipt of the query 111. For example, object relationships in the database system 114 are generally static (e.g., lasting for a period of time longer than a user session), and metadata describing object relationships can be generated and cached in the masking dependency metadata 126 prior to user requests. For example, when an object is created, the database system 114 knows what other objects the object is related to, and whether mask expressions 125 apply to the created object. In some implementations, however, an object hierarchy analyzer 128 dynamically determines the object hierarchy beneath the object(s) referenced in the query 111, when the query 111 is being processed by the query engine 118.

User/object owner permissions may also be cached in the masking dependency metadata 126, for better performance as compared to dynamic querying of permissions. For example, when a new user or object is created, or when authorization-related actions are executed in the database, such as granting or revoking of privileges or roles, metadata can be stored indicating for which objects the user or object has an unmasked privilege. However, a possible number of user/object-owner to database objects may be too large to efficiently generate and maintain in the masking dependency metadata 126, so user/object access requests may be dynamically determined by the security system 123, based on the authorization data 122, when processing the query 111.

The masking engine 120, by performing the masking status algorithm 124, enriches the masking dependency metadata 126 to include current masking status data applicable to the query 111, including indications of which mask expressions are (or will be) applied (if any) to which column(s) in the hierarchy due to the lack of an unmasked privilege at particular access point(s). The masking status algorithm 124 evaluates the entire object hierarchy beneath the object(s) being accessed by the query 111 with respect to all of the columns that are to be returned by the query 111.

Masking status data (and other masking dependency metadata 126) can be presented, e.g., in an analysis application 130 on the administrator client device 105, using one or more visualizations. For example, one or more data flow graphs and/or or one or more metadata tables can be presented in the analysis application 130. Example data flow graphs and metadata tables are described in more detail below.

As used in the present disclosure, the term "computer" is intended to encompass any suitable processing device. For example, although FIG. 1 illustrates a single server 102, a single end-user client device 104, and a single administrator client device 105, the system 100 can be implemented using a single, stand-alone computing device, two or more application servers 102, two or more administrator client devices 105, or two or more end-user client devices 104. Indeed, the server 102, the administrator client device 105, and the end-user client device 104 may be any computer or processing device such as, for example, a blade server, general-purpose personal computer (PC), Mac®, workstation, UNIX-based workstation, or any other suitable device. In other words, the present disclosure contemplates computers other than general-purpose computers, as well as computers without conventional operating systems. Further, the server 102, the administrator client device 105, and the end-user client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 140, 142, and 144 are used by the server 102, the administrator client device 105, and the end-user client device 104, respectively, for communicating with other systems in a distributed environment—including within the system 100—connected to the network 106. Generally, the interfaces 140, 142, and 144 each comprise logic encoded in software and/or hardware in a suitable combination and operable to communicate with the network 106. More specifically, the interfaces 140, 142, and 144 may each comprise software supporting one or more communication protocols associated with communications such that the network 106 or interface's hardware is operable to communicate physical signals within and outside of the illustrated system 100.

The server 102 includes one or more processors 146. Each processor 146 may be a central processing unit (CPU), a blade, an application specific integrated circuit (ASIC), a field-programmable gate array (FPGA), or another suitable component. Generally, each processor 146 executes instructions and manipulates data to perform the operations of the server 102. Specifically, each processor 146 executes the functionality required to receive and respond to requests from the end-user client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 148. In some implementations, the server 102 includes multiple memories. The memory 148 may include any type of memory or database module and may take the form of volatile and/or non-volatile memory including, without limitation, magnetic media, optical media, random access memory (RAM), read-only memory (ROM), removable media, or any other suitable local or remote memory component. The memory 148 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The end-user client device 104 and the administrator client device 105 may each generally be any computing device operable to connect to or communicate with the server 102 via the network 106 using a wireline or wireless connection. In general, the client device 104 and the administrator client device 105 each comprise an electronic computer device operable to receive, transmit, process, and store any appropriate data associated with the system 100 of FIG. 1. The client device 104 and the administrator client device 105 can each include one or more client applications, including the client application 108 or the analysis application 130, respectively. A client application is any type of application that allows the end-user client device 104 or the administrator client device 105 to request and view content on the respective client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 150 or processor(s) 151. Each processor in the processor(s) 150 and processor(s) 151 may be a central processing unit (CPU), an application specific integrated circuit (ASIC), a field-programmable gate array (FPGA), or another suitable component. Generally, each processor in the processor(s) 150 and processor(s) 151 executes instructions and manipulates data to perform the operations of the respective client device 104 or 105. Specifically, each processor included in the in the processor(s) 150 and processor(s) 151 executes the functionality required to send requests to the server 102 and to receive and process responses from the server 102.

The client devices 104 and 105 are each generally intended to encompass any client computing device such as a laptop/notebook computer, wireless data port, smart phone, personal data assistant (PDA), tablet computing device, one or more processors within these devices, or any other suitable processing device. For example, the client devices 104 and 105 may each comprise a computer that includes an input device, such as a keypad, touch screen, or other device that can accept user information, and an output device that conveys information associated with the operation of the server 102, or the client device itself, including digital data, visual information, or a graphical user interface (GUI) 152 or 153.

The GUIs 152 and 153 each interface with at least a portion of the system 100 for any suitable purpose, including generating a visual representation of the client application 108 or the analysis application 130, respectively. In particular, the GUIs 152 and 153 may be used to view and navigate various Web pages. Generally, the GUIs 152 and 153 provide the user with an efficient and user-friendly presentation of business data provided by or communicated within the system. The GUIs 152 and 153 may each comprise a plurality of customizable frames or views having interactive fields, pull-down lists, and buttons operated by the user. The GUIs 152 and 153 contemplate any suitable graphical user interface, such as a combination of a generic web browser, intelligent engine, and command line interface (CLI) that processes information and efficiently presents the results to the user visually.

Memory 154 and 156 respectively included in the end-user client device 104 and the administrator client device 105 may each include any memory or database module and may take the form of volatile or non-volatile memory including, without limitation, magnetic media, optical media, random access memory (RAM), read-only memory (ROM), removable media, or any other suitable local or remote memory component. The memories 154 and 156 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 or 105 associated with, or external to, the system 100. For example, while the illustrated system 100 includes one end-user client device 104 and one administrator client device 105, alternative implementations of the system 100 may include multiple client devices 104 or 105 communicably coupled to the server 102 and/or the network 106, or any other number suitable to the purposes of the system 100. Additionally, there may also be one or more additional client devices 104 or 105 external to the illustrated portion of system 100 that are capable of interacting with the system 100 via the network 106. Further, the term "client," "client device," and "user" may be used interchangeably as appropriate without departing from the scope of this disclosure. Moreover, while the client device 104 or 105 may be described in terms of being used by a single user, this disclosure contemplates that many users may use one computer, or that one user may use multiple computers.

Figures 2A, 2B:
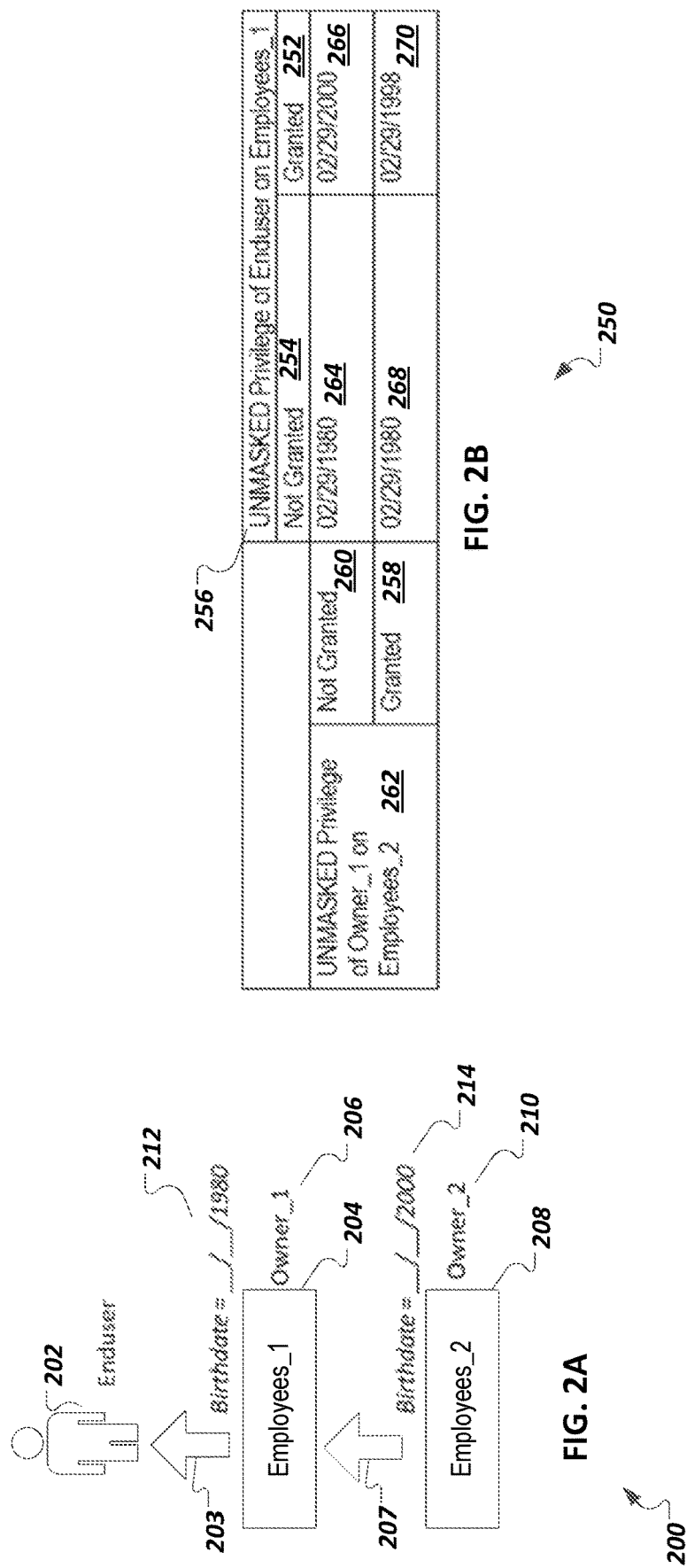
FIG. 2A is an example data flow graph that shows a flow of data to an end user in response to an end-user request.
FIG. 2B is an example table that illustrates which mask expression is applied, if any, given various authorizations for a dependent user/object and an underlying object.

FIG. 2A is an example data flow graph 200 that shows a flow of data to an end user 202 in response to an end-user request. As shown by a data flow 203 for a first level, the end-user 202 has requested data from an Employees_1 object 204, using, for example, a query that includes a Birthdate field. The Employees1_object 204 is owned, in a database system that receives the query, by a database user Owner_1 206.

As shown by a data flow 207 for a second level, the Employees_1 object 204 is based on (e.g., depends on) an underlying Employees_2 object 208. The Employees_1 object 204 may aggregate data from a Birthdate field included in the Employees_2 object 208 or otherwise provide a view on data in the Employees_2 object 208, for example. The Employees_2 object 208 is owned in the database system by a database user Owner_2 210. Each of the Employees_1 object 204 and the Employees_2 object 208 can have a mask defined for respective included Birthdate fields. For example, the Employees_1 object 204 can have a mask 212 of "___/___/1980" for the Birthdate field and the Employees_2 object 208 can have a mask 214 of "___/___/2000" for the Birthdate field (e.g., which indicate that day and month values are retained, but year values are changed to either 1980 or 2000, respectively). Whether a mask is to be applied, and which mask, can be determined by analyzing a combination of an unmasked privilege of the end user 202 on the Employees_1 object 204 and an unmasked privilege of the Owner_1 user 206 on the Employees_2 object 208, as described below for FIG. 2B.

FIG. 2B is a table 250 that illustrates which mask expression is applied, if any, given various authorizations for a dependent user/object and an underlying object. For example, the end-user 202 can either have (252) or not have (254) a granted unmasked privilege 256 for the Employees_1 object 204 of FIG. 2A. When the Employees_1 object 204 accesses data from the Employees_2 object 208, the Employees_1 object 204 is a dependent object and the Employees_2 object 208 is an underlying object. The owner of the dependent Employees_1 object 204 (e.g., Owner_1 206) can either have (258) or not have (260) a granted unmasked privilege 262 on the underlying Employees_2 object 208.

Given a possible granted 252 or non-granted 254 privilege 256 of the end user 202 on the Employees_1 object 208 and a possible granted 258 or non-granted 260 privilege 262 of the Owner_1 user 206 on the Employees_2 object 208, one of four possible resultant values 264, 266, 268, or 270 can be a result of a mask application process, in which a determination is made as to whether to apply a mask, and which mask to apply. For example, if the unmasked privilege 256 has not been granted to the end user 202 (e.g., 254) and the unmasked privilege 262 has not been granted to the Owner_1 user 206 (e.g., 260), then the result of the mask application process is the resultant value 264 of "02/29/1980," which corresponds to an application of the mask 212 of the Employees_1 object 204, resulting in a year value being obfuscated by the showing of the year 1980 rather than an actual year. The mask 212 is applied because the end user 202 has not been granted access to view sensitive data from the Employees_1 object 204. Accordingly, masks for the Employees_1 object 204, including the mask 212, are applied before query result data is provided to the end user 202. Similarly, the resultant value 268 of "02/29/1980" is a result of applying the mask 212 when the end user 202 has not been granted the unmasked privilege 256 on the Employees_1 object 204 (e.g., 254), even when the Owner_1 user 206 has been granted an unmasked privilege 262 on the Employees_2 object (e.g., 258). If the unmasked privilege 256 has been granted (e.g., 252) to the end user 202 for the Employees_1 object 204, then a determination can be made as to whether the Owner_1 user 206 who owns the Employees_1 object 204 has been granted the unmasked privilege 262 on the Employees_2 object 208.

For example, if the Owner_1 user 206 has not been granted the unmasked privilege 262 on the Employees_2 object 208 (e.g., 260), then the result of the mask application process is the resultant value 266 of "02/29/2000," which corresponds to an application of the mask 214 of the Employees_2 object 208, resulting in a year value being obfuscated by the showing of the year 2000 rather than an actual year. The mask 214 is applied because the Owner_1 user 206 has not been granted access to view sensitive data from the Employees_2 object 208. Accordingly, masks for the Employees_2 object 208, including the mask 214, are applied before data is provided to the Employees_1 object 204 from the Employees_2 object 208.

If the Owner_1 user 206 has been granted the unmasked privilege 262 on the Employees_2 object 208 (e.g., 258) and the end user 202 has been granted the unmasked privilege 256, then the result of the mask application process is the resultant value 270 of "02/29/1998,"which is an actual unmasked value (e.g., the year 1998 is an actual year value included in or produced by the Employees_1 object 204. No mask is applied because the end user 202 has access to sensitive data from the Employees_1 object and the Owner_1 user who owns the Employees_1 object has access to sensitive data from the Employees_2 object.

In some implementations, complex objects can be created with different modes which can affect a determination of an effective user. For example, an object can be defined with a definer mode that indicates that a privilege check is to be performed using the rights of an object owner. As another example, an object can be defined with an invoker mode that indicates that a privilege check is to be performed using the rights of an invoking (e.g., querying) user or object. Accordingly, depending on a mode of an object, an effective user can be different for different objects in the object hierarchy. The effective user can be an object owner for any definer-mode objects, and an owner of a next parent definer object in the hierarchy for any invoker-mode objects, for example.

FIG. 3 is a table 300 that can be used in a mask application process to determine which, if any, mask expressions to apply when generating results for a query. The table 300 includes a field name column 302 and a field description (e.g., meaning) column 304. A DEPENDENT_OBJECT_NAME field 308 can include a name of a dependent object. A DEPENDENT_OBJECT_TYPE field 310 can include a type of the dependent object named in the DEPENDENT_OBJECT_NAME field 308. Dependent object types can include view, procedure, or function, to name a few examples. A DEPENDENT_COLUMN_NAME field 312 can include a name of a column in the dependent object named in the DEPENDENT_OBJECT_NAME field 308. An UNDERLYING_OBJECT_NAME field 314 can include the name of an underlying object that is a direct child of the dependent object named in the DEPENDENT_OBJECT_NAME field 308. An UNDERLYING_OBJECT_TYPE field 316 can include a type (e.g., view, procedure, function) of the underlying object named in the UNDERLYING_OBJECT_NAME field 314. An UNDERLYING_COLUMN_NAME field 318 can include a name of a column in the underlying object named in the UNDERLYING_OBJECT_NAME field 314.

An EFFECTIVE_USER_NAME field 320 can include the name of a user that is effectively accessing the underlying object named in the UNDERLYING_OBJECT_NAME field 314. A MASK_EXPRESSION field 322 can include a mask expression that is attached to the underlying object named in the UNDERLYING_OBJECT_NAME field 314. A MASK_EXPRESSION_STATUS field 324 can include a value (e.g., NULL, APPLIED, NOT APPLIED) that indicates whether masking is applied for the column. For example, NOT APPLIED can indicate that the effective user has an UNMASKED privilege for the underlying object, APPLIED can indicate that the effective user does not have the UNMASKED privilege for the underlying object, and NULL can indicate that the column named in the UNDERLYING_COLUMN_NAME field 318 does not have a mask definition.

FIG. 4 is a table 400 that includes masking-related metadata corresponding to the data flow graph 200 of FIG. 2A. A field name column 402 includes names of metadata fields described above in FIG. 3. A level one column 404 includes values for the metadata fields that correspond to data flow 203 for the first level of FIG. 2A. Similarly, a level two column 406 includes values for the metadata fields that correspond to the data flow 207 for the second level of FIG. 2A. Values 408 and 409 of "<Final Result>" for the DEPENDENT_OBJECT_NAME field 308 and the DEPENDENT_OBJECT_TYPE field 310 in the level one column 404 represent that the end query result provided to the end user 202 is an un-named top level object in a dependent object hierarchy. The DEPENDENT_COLUMN_NAME field 314 and the UNDERLYING_COLUMN_NAME field 318 respectively include "Birthdate" values 410 and 412 in the level one column 404, which indicates that a Birthdate column in the query result is based on a Birthdate column in an underlying object used by the query. The underlying object is identified by an "Employees_1" object name value 414 for the UNDERLYING_OBJECT_NAME field 314 in the level one column 404.

A value 416 of "View" for the UNDERLYING_OBJECT_TYPE field 316 in the level one column 404 indicates that the Employees_1 object is a view. An "Enduser" value 418 for the EFFECTIVE_USER_NAME field 320 indicates that the end user 202 is the user effectively accessing the Birthdate column in the Employees_1 object. A mask expression 420 of "Birthdate=___/___/1980" for the MASK_EXPRESSION field 322 in the level one column 404 is a mask expression defined for the Birthdate column in the Employees_1 object. An "APPLIED" value 422 for the MASK_EXPRESSION_STATUS field 324 in the level one column 404 indicates that the mask expression 420 has been (or will be) applied to the query result. The APPLIED value 422 can represent a situation in which the end user 202 does not have the Unmasked privilege on the Employees_1 object, for example.

An Employees_1 value 424 for the DEPENDENT_OBJECT_NAME field 308 in the level two column 406 indicates that the Employees_1 object depends on another object. That other, underlying object is identified by an Employees_2 value 426 for the UNDERLYING_OBJECT_NAME field 314 in the level two column 406. A value 427 of "Owner_1" for the EFFECTIVE_USER_NAME field 320 in the level two column 406 indicates that Owner_1, the owner of the Employees_1 object, is the effective user when the Employees_1 object accesses the Employees_2 object. "View" values 428 and 429 for the DEPENDENT_OBJECT_TYPE field 310 and the UNDERLYING_OBJECT_TYPE field 316 in the level two column 406, respectively, indicate that both the Employees_1 and Employees_2 objects are views. A Birthdate value 430 for the DEPENDENT_COLUMN_NAME field 312 and a Birthdate value 432 for the UNDERLYING_COLUMN_NAME field 318 in the level two column 406 collectively indicate that the Birthdate column of the Employees_1 object is based on the Birthdate column of the Employees_2 object.

A mask expression 434 of "Birthdate=___/___/2000" for the MASK_EXPRESSION field 322 in the level two column 406 is a mask expression defined for the Birthdate column in the Employees_2 underlying object. An "APPLIED" value 436 for the MASK_EXPRESSION_STATUS field 324 in the level two column 406 indicates that the mask expression 434 has been (or will be) applied to data provided from the Employees_2 underlying object to the Employees_2 dependent object. The APPLIED value 436 can represent a situation in which the Owner_1 effective user does not have the Unmasked privilege on the Employees_2 object, for example. However, since the mask expression 420 is to be applied and is at a level closer to the final result than the mask expression 434, the mask expression 420 is the mask expression that is ultimately applied to the final result provided to the end user.

Figure 5:
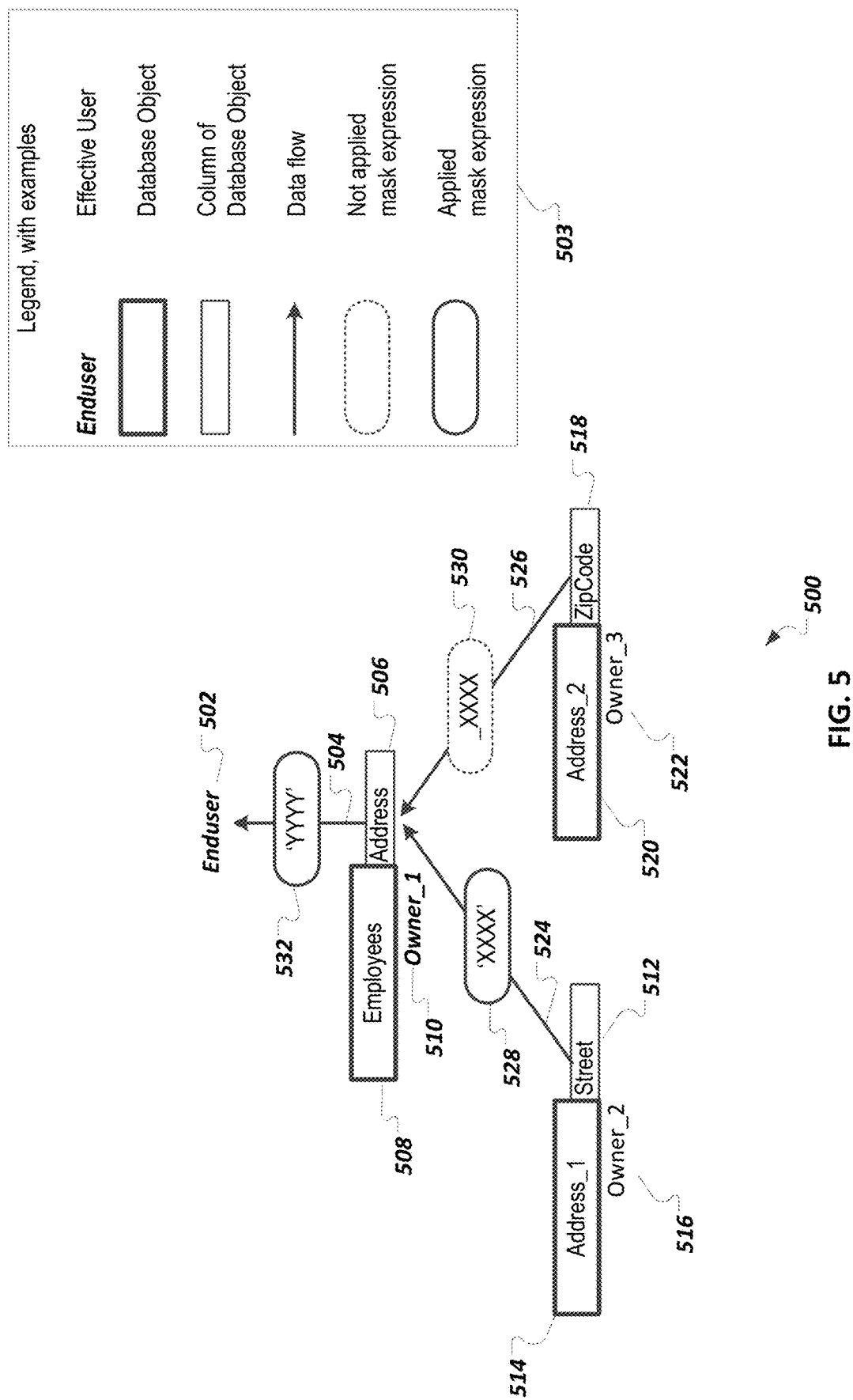
FIG. 5 is an example data flow graph that shows a flow of data to an end user in response to an end-user request.

FIG. 5 is an example data flow graph 500 that shows a flow of data to an end user 502 in response to an end-user request. A legend 503 describes various symbols included in the data flow graph 500. As illustrated by a data flow 504, the end user 502 has requested data from an Address column 506 in an Employees database object 508 owned by an Owner_1 database user 510.

FIG. 6 is a table 600 that includes masking-related metadata corresponding to the data flow graph 500 of FIG. 5. For example, a level one column 602 includes metadata corresponding to the data flow 504. For example, values 604 and 606 of "<Final Result>" for the DEPENDENT_OBJECT_NAME field 308 and the DEPENDENT_OBJECT_TYPE field 310 in the level one column 602 represent that the end query result provided to the end user 502 is an un-named top level object in a dependent object hierarchy. The DEPENDENT_COLUMN_NAME field 314 and the UNDERLYING_COLUMN_NAME field 318 respectively include "Address" values 608 and 610 in the level one column 602, which indicates that an Address column in the query result is based on an Address column in the underlying Employees object 508 used by the query. The underlying Employees object 508 is identified in the level one column 602 by an "Employees" object name value 612 for the UNDERLYING_OBJECT_NAME field 314. A value 614 of "View" for the UNDERLYING_OBJECT_TYPE field 316 in the level one column 602 indicates that the Employees object is a view. An "Enduser" value 616 for the EFFECTIVE_USER_NAME field 320 in the level one column 602 indicates that the end user 502 is the user effectively accessing the Address column in the Employees object.

Referring again to FIG. 5, the Address column 506 of the Employees object 508 is based on (e.g., depends on) a Street column 512 of an Address_1 object 514 owned by an Owner_2 database user 516 and on a ZipCode column 518 of an Address_2 object 520 owned by an Owner_3 database user 522. The dependence of the Address column 506 on the Street column 512 is represented by a data flow 524. The dependence of the Address column 506 on the ZipCode column 518 is represented by a data flow 526.

The data flows 524 and 526 are represented in the table 600 of FIG. 6 by a level two column 620 and a level three column 622, respectively. For example, respective "Employees" values 624 and 626 for the DEPENDENT_OBJECT_NAME field 308 and respective "View" values 628 and 630 for the DEPENDENT_OBJECT_TYPE field 310, in the level two and level three columns 620 and 622 represent that the Employees view object 508 is a dependent object with respect to the data flows 524 and 526, respectively. Respective "Address" values 632 and 634 in the level two and level three columns 620 and 622 represent that the Address column 506 is based on data from underlying objects. An "Address_1" value 636 for the UNDERLYING_OBJECT_NAME field 314, a "View" value 638 for the UNDERLYING_OBJECT_TYPE field 316, and a "Street" value 640 in the UNDERLYING_COLUMN_NAME field 318 in the level two column 602 indicate that the Street column 512 of the Address_1 database view object 514 contributes to the Address column 506. Similarly, an "Address_2" value 642 for the UNDERLYING_OBJECT_NAME field 314, a "View" value 644 for the UNDERLYING_OBJECT_TYPE field 316, and a "ZipCode" value 646 in the UNDERLYING_COLUMN_NAME field 318 in the level three column 604 indicate that the ZipCode column 518 of the Address_2 database view object 520 contributes to the Address column 506. "Owner_1" values 648 and 650 in the EFFECTIVE_USER field 320 in the level two and level three columns 602 and 604 indicate that the Owner_1 user 506 of the Employees object 508 is the effective user when the Employees object 508 accesses the Street column 512 and the ZipCode column 518, respectively, when populating the Address column 506.

A mask expression 528 of 'XXXX' is shown in FIG. 5 as applied to the Street column 512 of the Address_1 object 514, because the Owner_1 user 510 does not have an Unmasked privilege on the Address_1 object 514. The application of the mask expression 528 is reflected in the table 600, by a mask expression 652 and an "APPLIED" mask expression status 654.

In FIG. 5, a mask expression 530 (e.g., of "_XXXX", for hiding the last four digits of a zip code) for the ZipCode column 518 is not applied because the Owner_1 user 510 does have the Unmasked privilege for the Address_2 object 520. The non-application of the mask expression 530 is reflected in the table 600, by a mask expression 656 and a "NOT APPLIED" mask expression status 658.

The end user 502 does not have the Unmasked privilege on the Employees object 508, so a mask expression 532 of "YYYY" is applied to the Address column 506 of the Employees object 508. The application of the mask expression 532 is reflected in the table 600, by a mask expression 660 and an "APPLIED" mask expression status 662.

The data flow graph 500 of FIG. 5 and/or the table 600 of FIG. 6, or portions thereof, may be presented, e.g., to an administrator, to troubleshoot issues that may be occurring with query processing. Data in the table 600 may be generated by and/or referenced by a masking status process, as part of the generation of masking status data. The examples of FIG. 5 and FIG. 6 are further described below, in the description of the masking status data determination method discussed in FIG. 7.

Figure 7:
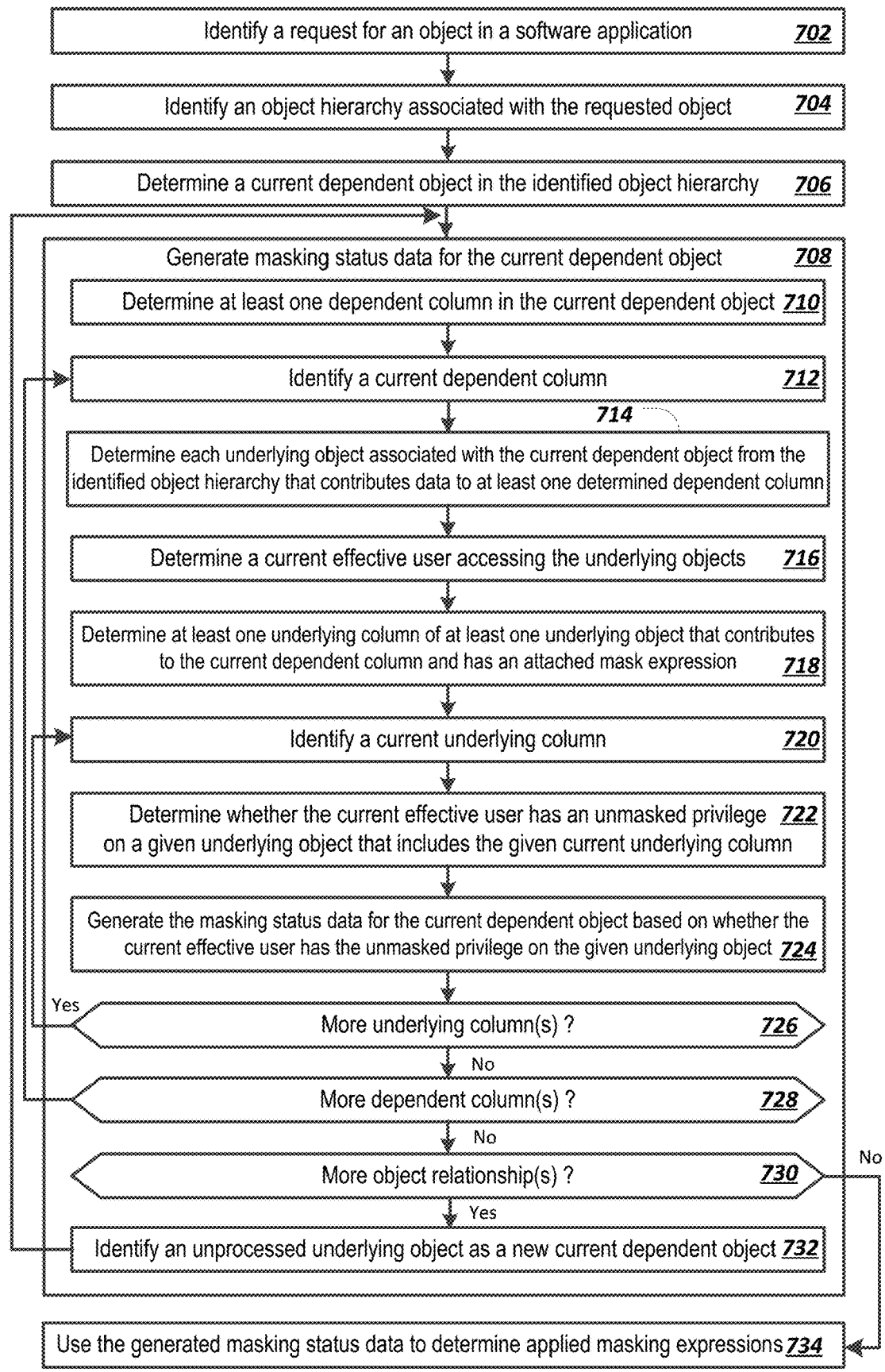
FIG. 7 is a flowchart of an example method for determining masking status data for a request for a database object.

FIG. 7 is a flowchart of an example method 700 for determining masking status data for a request for a database object. It will be understood that method 700 and related methods may be performed, for example, by any suitable system, environment, software, and hardware, or a combination of systems, environments, software, and hardware, as appropriate. For example, one or more of a client, a server, or other computing device can be used to execute method 700 and related methods and obtain any data from the memory of a client, the server, or the other computing device. In some implementations, the method 700 and related methods are executed by one or more components of the system 100 described above with respect to FIG. 1. For example, the method 600 and related methods can be executed by the masking engine 120 of FIG. 1. The method 700 is described below in part with respect to the example shown in FIGS. 5 and 6.

At 702, a request for an object in a software application is identified. The request is associated with a particular user. For example, with respect to FIG. 5, the end user 502 has submitted a request for data from the Employees object 508.

At 704, an object hierarchy associated with the requested object is identified. At least one column in the object hierarchy is associated with a mask expression. For example, with respect to FIG. 5, the data graph 500 depicts an object hierarchy that has the Employees object 508 as a topmost object node. The Employees object 508 is associated with the mask expression 532.

At 706, a current dependent object in the identified object hierarchy is determined. For example, with respect to FIG. 5, a query result (e.g., "final result") sent to the end user 502, represented by the data flow 504, can be determined as a current dependent object. The "<Final Result>" object name value 604 in the table 600 of FIG. 6 records the determination of the query result as the current dependent object.

As described above, some or all of the metadata in the table 600 may be generated as a result of execution of the method 700. As another example, some of the metadata 600 may be generated before the request for the Employees object 508 by the end user 502.

At 708, masking status data is generated for the current dependent object that identifies whether masking is to be applied to the current dependent object when fulfilling the request. The generation of the masking status data includes, at 710, a determination of at least one dependent column in the current dependent object. For example, with respect to FIG. 5, and as illustrated by the data flow 504, the query result for the end user request includes an Address column (e.g., based on the Address column 506 of the Employees object 508). In FIG. 6, the "Address" value 608 is recorded in the table 600 as a dependent column name of the "<Final Result"> dependent object. At 712, a current dependent column of the determined dependent columns is identified. In the example of FIG. 5, when the current dependent object is the query result, the Address column is identified (e.g., since it is the only dependent column of the query result—if multiple dependent columns are determined, one of the multiple dependent columns is identified).

The generation of the masking status data includes, at 714, a determination of each underlying object associated with the current dependent object from the identified object hierarchy that contributes data to the current dependent column. In the example of FIG. 5, the Employees object 508 contributes to the Address column in the query result (e.g., through the Address column 506). In the table 600 of FIG. 6, the Employees object name value 612 is a recording of the determined underlying Employees object 508 that contributes to the query result.

At 716, a current effective user accessing the underlying objects is determined. When the current dependent object is the query result, the current effective user is the end user 502, as indicated by the "Enduser" value 616 in the table 600.

At 718, at least one underlying column of at least one underlying object is determined. Each determined underlying column contributes to the current dependent column and has an attached mask expression. In the example of FIG. 5, when the current dependent object is the query result, one column, the Address column 506 of the Employees object 508, is determined to be an underlying column (e.g., as indicated by the dependent column name value 610 in the table 600). At 720, a current underlying column of the determined underlying columns is identified. In the example of FIG. 5, when the current dependent object is the query result, the Address column 506 is identified (e.g., since it is the only determined underlying column—if multiple underlying columns are determined, one of the multiple underlying columns is identified).

At 722, a determination is made as to whether the current effective user has an unmasked privilege on a given underlying object that includes the current underlying column. For example, in FIG. 5, a determination is made as to whether the end user 502 has the unmasked privilege on the Employees object 508. In the example of FIG. 5, the end user 502 does not have the unmasked privilege on the Employees object 508.

At 724, masking status data is generated for the current dependent object based on whether the current effective user has the unmasked privilege on the given underlying object. In the example of FIG. 5, since the end user 502 does not have the unmasked privilege on the Employees object 508, a masking status is generated that indicates that the attached mask expression 532 for the Address column 506 of the given underlying Employees object 508 is applied for the end user 502 when the end user 502 accesses the Employees object 506. For example, the table 600 includes the mask expression 660 and the "APPLIED" mask expression status 662.

At 726, a determination is made as to whether there are any unprocessed underlying columns in the underlying columns determined in step 718. In the example, of FIG. 5, when the current dependent object is the query result, only one underlying column was determined, so there are no unprocessed underlying columns at step 726.

At 728, a determination is made as to whether there are any unprocessed dependent columns in the dependent columns determined in step 710. In the example, of FIG. 5, when the current dependent object is the query result, only one dependent column was determined, so there are no unprocessed dependent columns at step 728.

At 730, a determination is made as to whether there are any unprocessed object relationships beneath the current dependent object in the object hierarchy. In the example of FIG. 5, an object relationship between the Employees object 508 and the Address_1 object 514 has not been processed. At 732, an unprocessed underlying object is identified as a new current dependent object. In the example of FIG. 5, the Employees object 508 is identified as an underlying object that has not been processed as a dependent object, and is therefore identified as a new current dependent object. The method 700 includes the recursively repeating of the generating of masking status data using the new current dependent object as the current dependent object. For example, method 700 includes a second iteration of step 708 (and its substeps), with the Employees object 508 as the current dependent object. The second iteration of step 708 (and its substeps) is described below. The "Employees" value 624 in the level two column 620 in the table 600 represents the assigning of the Employees object 508 as the new current dependent object for the method 700.

At 710, at least one dependent column in the current dependent object is determined. For example, with respect to FIG. 5, when the Employees object 508 is the current dependent object, the Address column 506 is determined to be a dependent column. In FIG. 6, the "Address" value 632 is recorded as a dependent column name of the Employees dependent object. At 712, a given dependent column of the determined dependent columns is identified. In the example of FIG. 5, when the current dependent object is the Employees object, the Address column 506 is identified (e.g., as the only dependent column).

At 714, each underlying object associated with the current dependent object that contributes data to the identified dependent column is determined. In the example of FIG. 5, the Address_1 object 514 and the Address_2 object 520 contribute to the Address column 506.

At 716, a current effective user accessing the underlying objects is determined. For the example of FIG. 5, when the current dependent object is the Employees object, the current effective user is the Owner_1 user 510, as indicated by the "Owner_1" value 648 in the table 600.

At 718, at least one underlying column of at least one underlying object is determined. Each determined underlying column contributes to the given determined dependent column and has an attached mask expression. In the example of FIG. 5, when the current dependent object is the Employees object 508, the Street column 512 and the ZipCode column 518 are determined to be underlying columns.

At 720, a current underlying column of the determined underlying columns is identified. In the example of FIG. 5, the Street column 512 can be identified as the current underlying column (e.g., as illustrated by an underlying column name value 640 in the table 600).

At 722, a determination is made as to whether the current effective user has an unmasked privilege on a given underlying object that includes the current underlying column. For example, in FIG. 5, a determination is made as to whether the Owner_1 user 510 has the unmasked privilege on the Address_1 object 514 that includes the current underlying Street column 512. In the example of FIG. 5, the Owner_1 user 510 does not have the unmasked privilege on the Address_1 object 508.

At 724, masking status data is generated for the current dependent object based on whether the current effective user has the unmasked privilege on the given underlying object. In the example of FIG. 5, since the Owner_1 user 510 does not have the unmasked privilege on the Address_1 object 514, a masking status is generated that indicates that the attached mask expression 528 for the Street column 512 of the given underlying Address_1 object 514 is applied when the Address_1 object 514 provides data to the Employees object 506. For example, the table 600 includes the mask expression 652 and the "APPLIED" mask expression status 654.

At 726, a determination is made as to whether there are any unprocessed underlying columns in the underlying columns determined in step 718. In the example, of FIG. 5, when the current dependent object is the Employees object, the ZipCode column 518 is an unprocessed underlying column. Since there is at least one unprocessed underlying column, the method 700 returns to step 720.

At 720, a current underlying column of the determined underlying columns is identified. In the example of FIG. 5, the ZipCode column 518 can be identified as the current underlying column (e.g., as illustrated by an underlying column name value 646 in the table 600).

At 722, a determination is made as to whether the current effective user has an unmasked privilege on a given underlying object that includes the current underlying column. For example, in FIG. 5, a determination is made as to whether the Owner_1 user 510 has the unmasked privilege on the Address_2 object 520 that includes the ZipCode column 518. In the example of FIG. 5, the Owner_1 user 510 does have the unmasked privilege on the Address_1 object 520.

At 724, masking status data is generated for the current dependent object based on whether the current effective user has the unmasked privilege on the given underlying object. In the example of FIG. 5, since the Owner_1 user 510 has the unmasked privilege on the Address_2 object 520, a masking status is generated that indicates that the attached mask expression 530 for the ZipCode column 518 of the given underlying Address_2 object 520 is not applied when the Address_2 object 520 provides data to the Employees object 506. For example, the table 600 includes the mask expression 656 and the "NOT APPLIED" mask expression status 658.

At 726, a determination is made as to whether there are any unprocessed underlying columns in the underlying columns determined in step 718. In the example, of FIG. 5, after the ZipCode column 518 is processed, there are no unprocessed underlying columns at step 726.

At 728, a determination is made as to whether there are any unprocessed dependent columns in the dependent columns determined in step 710. In the example, of FIG. 5, when the current dependent object is the Employees object 508, only one dependent column (e.g., the Address column 506) was determined, so there are no unprocessed dependent columns at step 728.

At 730, a determination is made as to whether there are any unprocessed object relationships beneath the current dependent object in the object hierarchy. In the example of FIG. 5, after processing the relationship between the Employees object 508 and the Address_1 object 514, and the relationship between the Employees object 508 and the Address_2 object 520, there are no unprocessed object relationships. Accordingly, the recursive iteration of step 708 ends.

At 734, the generated masking status data is used to determine which masking expressions are to be applied to which columns in the object hierarchy when responding to the request. For example, the generated masking status data can be used to provide the applied masking expressions 660 and 652, e.g., to a query engine. As another example, visualizations of the generated masking status data (e.g., similar to the data graph 500 and/or the table 600) can be presented in a user interface, such as for use by an administrator to troubleshoot a situation in which unexpected query results have occurred.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method comprising:
identifying a request for an object in a software application, the request associated with a particular user;
identifying an object hierarchy associated with the requested object, wherein at least one column in the object hierarchy is associated with a mask expression;
identifying the requested object as a current dependent object in the identified object hierarchy;
iteratively processing the identified object hierarchy using the current dependent object, wherein iteratively processing includes:
  generating masking status data for the current dependent object that identifies whether masking is to be applied to the current dependent object when fulfilling the request, including:
    determining at least one dependent column in the current dependent object;
    for each given determined dependent column:
      determining each underlying object associated with the current dependent object from the identified object hierarchy that contributes data to the given determined dependent column;
      determining a current effective user accessing the underlying objects, wherein the determination includes:
        determining that the particular user is the current effective user accessing the underlying object based on the current dependent object being the requested object; and
        determining that the owner of the current dependent object is the current effective user accessing the underlying object based on the current dependent object being a different object than the requested object;
      determining at least one underlying column of at least one underlying object that contributes to the given determined dependent column and has an attached mask expression; and
      for each given determined underlying column:
        determining whether the current effective user has an unmasked privilege on a given underlying object that includes the given determined underlying column; and
        generating masking status data for the current dependent object based on whether the current effective user has the unmasked privilege on the given underlying object;
  determining whether there are any unprocessed object relationships beneath the current dependent object in the object hierarchy; and
  in response to determining that there is at least one unprocessed object relationship beneath the current dependent object in the object hierarchy:
    identifying an unprocessed underlying object as a new current dependent object; and
    continuing the iterative processing of the object hierarchy by recursively repeating the generating of masking status data using the new current dependent object as the current dependent object;
using the generated masking status data to determine which masking expressions are to be applied to which columns in the object hierarchy when responding to the request; and
responding to the request for the object, wherein the responding includes applying the determined masking expressions to the columns in the object hierarchy.

2. The method of claim 1, wherein generating the masking status data for the current dependent object based on whether the current effective user has the unmasked privilege on the given underlying object comprises:
  determining that the current effective user has the unmasked privilege on the given underlying object; and
  generating a first masking status that indicates that the attached mask expression for the given underlying column of the given underlying object is not applied for the effective user when the effective user accesses the given underlying object from the current dependent object.

3. The method of claim 1, wherein generating the masking status data for the current dependent object based on whether the current effective user has the unmasked privilege on the given underlying object comprises:
  determining that the current effective user does not have the unmasked privilege on the given underlying object; and
  generating a second masking status that indicates that the attached mask expression for the given underlying column of the given underlying object is applied for the effective user when the effective user accesses the given underlying object from the current dependent object.

4. The method of claim 1, further comprising presenting a visualization of the generated masking status data on a user interface.

5. The method of claim 1:
  wherein identifying the request for the object includes anticipating a future request for the object by the particular user;
  the method further comprising:
    caching the generated masking status data;
    receiving a request for the object by the particular user;
    identifying the cached masking status data as matching the request;
    identifying, using the cached masking status data, at least one masking expression to apply to the request; and
    applying the at least one identified masking expression to the request.

6. The method of claim 1, wherein the masking metadata is generated responsive to the request for the object by the particular user.

7. The method of claim 1, wherein the current dependent object is, in a first iteration of the generation of masking status data, a query result that is responsive to the request.

8. The method of claim 1, wherein the current dependent object is, in a subsequent iteration of the generation of masking status data, a first object that contributes to the query result.

9. A system comprising:
  one or more computers; and
  a computer-readable medium coupled to the one or more computers having instructions stored thereon which, when executed by the one or more computers, cause the one or more computers to perform operations comprising:
    identifying a request for an object in a software application, the request associated with a particular user;
    identifying an object hierarchy associated with the requested object, wherein at least one column in the object hierarchy is associated with a mask expression;
    identifying the requested object as a current dependent object in the identified object hierarchy;
    iteratively processing the identified object hierarchy using the current dependent object, wherein iteratively processing includes:
      generating masking status data for the current dependent object that identifies whether masking is to be applied to the current dependent object when fulfilling the request, including:
        determining at least one dependent column in the current dependent object;
        for each given determined dependent column:
          determining each underlying object associated with the current dependent object from the identified object hierarchy that contributes data to the given determined dependent column;
          determining a current effective user accessing the underlying objects, wherein the determination includes:
            determining that the particular user is the current effective user accessing the underlying object based on the current dependent object being the requested object; and
            determining that the owner of the current dependent object is the current effective user accessing the underlying object based on the current dependent object being a different object than the requested object;
          determining at least one underlying column of at least one underlying object that contributes to the given determined dependent column and has an attached mask expression; and
          for each given determined underlying column:
            determining whether the current effective user has an unmasked privilege on a given underlying object that includes the given determined underlying column; and
            generating masking status data for the current dependent object based on whether the current effective user has the unmasked privilege on the given underlying object;
      determining whether there are any unprocessed object relationships beneath the current dependent object in the object hierarchy; and
      in response to determining that there is at least one unprocessed object relationship beneath the current dependent object in the object hierarchy:
        identifying an unprocessed underlying object as a new current dependent object; and
        continuing the iterative processing of the object hierarchy by recursively repeating the generating of masking status data using the new current dependent object as the current dependent object;
    using the generated masking status data to determine which masking expressions are to be applied to which columns in the object hierarchy when responding to the request; and
    responding to the request for the object, wherein the responding includes applying the determined masking expressions to the columns in the object hierarchy.

10. The system of claim 9, wherein generating the masking status data for the current dependent object based on whether the current effective user has the unmasked privilege on the given underlying object comprises:
  determining that the current effective user has the unmasked privilege on the given underlying object; and generating a first masking status that indicates that the attached mask expression for the given underlying column of the given underlying object is not applied for the effective user when the effective user accesses the given underlying object from the current dependent object.

11. The system of claim 9, wherein generating the masking status data for the current dependent object based on whether the current effective user has the unmasked privilege on the given underlying object comprises:
   determining that the current effective user does not have the unmasked privilege on the given underlying object; and
   generating a second masking status that indicates that the attached mask expression for the given underlying column of the given underlying object is applied for the effective user when the effective user accesses the given underlying object from the current dependent object.

12. A computer program product encoded on a non-transitory storage medium, the product comprising non-transitory, computer readable instructions for causing one or more processors to perform operations comprising:
   identifying a request for an object in a software application, the request associated with a particular user;
   identifying an object hierarchy associated with the requested object, wherein at least one column in the object hierarchy is associated with a mask expression;
   identifying the requested object as a current dependent object in the identified object hierarchy;
   iteratively processing the identified object hierarchy using the current dependent object, wherein iteratively processing includes:
      generating masking status data for the current dependent object that identifies whether masking is to be applied to the current dependent object when fulfilling the request, including:
         determining at least one dependent column in the current dependent object;
         for each given determined dependent column:
            determining each underlying object associated with the current dependent object from the identified object hierarchy that contributes data to the given determined dependent column;
            determining a current effective user accessing the underlying objects, wherein the determination includes:
               determining that the particular user is the current effective user accessing the underlying object based on the current dependent object being the requested object; and
               determining that the owner of the current dependent object is the current effective user accessing the underlying object based on the current dependent object being a different object than the requested object;
            determining at least one underlying column of at least one underlying object that contributes to the given determined dependent column and has an attached mask expression; and
            for each given determined underlying column:
               determining whether the current effective user has an unmasked privilege on a given underlying object that includes the given determined underlying column; and
               generating masking status data for the current dependent object based on whether the current effective user has the unmasked privilege on the given underlying object;
         determining whether there are any unprocessed object relationships beneath the current dependent object in the object hierarchy; and
         in response to determining that there is at least one unprocessed object relationship beneath the current dependent object in the object hierarchy:
            identifying an unprocessed underlying object as a new current dependent object; and
            continuing the iterative processing of the object hierarchy by recursively repeating the generating of masking status data using the new current dependent object as the current dependent object;
      using the generated masking status data to determine which masking expressions are to be applied to which columns in the object hierarchy when responding to the request; and
      responding to the request for the object, wherein the responding includes applying the determined masking expressions to the columns in the object hierarchy.

13. The computer program product of claim 12, wherein generating the masking status data for the current dependent object based on whether the current effective user has the unmasked privilege on the given underlying object comprises:
   determining that the current effective user has the unmasked privilege on the given underlying object; and
   generating a first masking status that indicates that the attached mask expression for the given underlying column of the given underlying object is not applied for the effective user when the effective user accesses the given underlying object from the current dependent object.

14. The computer program product of claim 12, wherein generating the masking status data for the current dependent object based on whether the current effective user has the unmasked privilege on the given underlying object comprises:
   determining that the current effective user does not have the unmasked privilege on the given underlying object; and
   generating a second masking status that indicates that the attached mask expression for the given underlying column of the given underlying object is applied for the effective user when the effective user accesses the given underlying object from the current dependent object.

* * * * *